United States Patent
Blachman et al.

(10) Patent No.: US 12,229,228 B2
(45) Date of Patent: Feb. 18, 2025

(54) SYSTEM AND METHOD FOR CLIENT-SIDE REWRITING OF CODE INCLUDED IN A WEB PAGE

(71) Applicant: Microsoft Technology Licensing, LLC, Redmond, WA (US)

(72) Inventors: Meir Baruch Blachman, Beer Sheva (IL); Itamar Azulay, Mishmar Ayyalon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 321 days.

(21) Appl. No.: 17/730,776

(22) Filed: Apr. 27, 2022

(65) Prior Publication Data

US 2023/0350984 A1    Nov. 2, 2023

(51) Int. Cl.
*G06F 21/12*   (2013.01)
*G06F 16/955*  (2019.01)
*G06F 16/958*  (2019.01)
*G06F 21/54*   (2013.01)

(52) U.S. Cl.
CPC ........ *G06F 21/125* (2013.01); *G06F 16/9566* (2019.01); *G06F 16/958* (2019.01); *G06F 21/54* (2013.01)

(58) Field of Classification Search
CPC ..... G06F 16/958; G06F 16/9566; G06F 16/54
USPC .................................................. 717/105–121
See application file for complete search history.

(56) References Cited

U.S. PATENT DOCUMENTS

| | | | | |
|---|---|---|---|---|
| 6,334,189 B1 * | 12/2001 | Granger | ................. | G06F 21/14 380/255 |
| 6,480,959 B1 * | 11/2002 | Granger | ................. | G06F 21/14 726/32 |
| 6,643,775 B1 * | 11/2003 | Granger | ............. | G06F 21/6209 380/255 |
| 6,691,301 B2 * | 2/2004 | Bowen | ................... | G06F 30/30 712/15 |

(Continued)

OTHER PUBLICATIONS

Moro et al."A Version Model for Supporting Adaptation of Web Pages", ACM, pp. 120-127 (Year: 2004).*

(Continued)

*Primary Examiner* — Anil Khatri
(74) *Attorney, Agent, or Firm* — Weaver IP L.L.C.

(57) ABSTRACT

Systems and methods are described for client-side rewriting of web page code. A proxy computing device receives a web page from a server computing device and analyzes the web page to identify a code component. The proxy computing device generates a modified version of the web page by replacing the identified code component with a wrapped code component and including a code rewriting and evaluation function in the web page. The wrapped code component includes a call to the code rewriting and evaluation function that includes the identified code component as an argument thereof. The code rewriting and evaluation function is configured to generate a rewritten code component by rewriting the identified code component and to evaluate the rewritten code component. The proxy computing device (Continued)

sends the modified version of the web page to a client computing device that is configured to load the modified version of the web page.

20 Claims, 6 Drawing Sheets

(56) References Cited

U.S. PATENT DOCUMENTS

| | | | | |
|---|---|---|---|---|
| 6,742,175 | B1 * | 5/2004 | Brassard | G06F 8/71 717/107 |
| 7,827,487 | B1 * | 11/2010 | Nickerson | G06F 16/95 715/790 |
| 8,392,877 | B1 * | 3/2013 | Chiluvuri | G06F 8/36 717/106 |
| 8,752,183 | B1 | 6/2014 | Aranguren-aznarez et al. | |
| 8,938,686 | B1 * | 1/2015 | Erenrich | G06F 40/143 715/781 |
| 9,116,717 | B2 * | 8/2015 | Soeder | G06F 9/4486 |
| 9,443,192 | B1 * | 9/2016 | Cosic | G06N 5/048 |
| 9,460,222 | B2 | 10/2016 | Gutkin et al. | |
| 9,686,372 | B1 * | 6/2017 | Anne | H04L 67/568 |
| 10,146,522 | B1 * | 12/2018 | Sundresh | G06F 8/656 |
| 10,574,771 | B2 * | 2/2020 | Schejter | G06F 16/9566 |
| 10,719,188 | B2 * | 7/2020 | Sanches | G06F 16/2425 |
| 11,748,129 | B2 * | 9/2023 | Belsey | G06F 12/0802 718/1 |
| 12,047,469 | B1 * | 7/2024 | Prasad | H04L 63/0281 |
| 2018/0295134 | A1 | 10/2018 | Gupta et al. | |
| 2018/0359330 | A1 * | 12/2018 | Martin | H04L 63/0281 |
| 2021/0029089 | A1 | 1/2021 | Lewin et al. | |

OTHER PUBLICATIONS

Artzi et al., "A Framework for Automated Testing of JavaScript Web Applications", ACM, pp. 571-580 (Year: 2011).*
Borgolte et al., "Relevant Change Detection", ACM, pp. 595-597 (Year: 2104).*
Ozono et al., "WFE-enabled Web Page Transformation: Generating Real-Time Collaborative Editing Systems from Exisiting Web Pages", IEEE, pp. 188-193 (Year: 2013).*
Anjum et al., "Aiding Web Crawlers; Projecting web page last modification", IEEE, pp. 1-8 (Year: 2012).*
Jayawardana et al., "Modeling Updates of Scholarly Webpages Using Archived Data", IEEE, pp. 1868-1877 (Year: 2020).*
"International Search Report and Written Opinion Issued in PCT Application No. PCT/US23/016173", Mailed Date: Jul. 6, 2023, 10 Pages.
"this in JavaScript", Retrieved from: https://web.archive.org/web/20210506161522/https://www.geeksforgeeks.org/this-in-javascript/, May 6, 2021, 13 Pages.
"JavaScript | Object.getOwnPropertyDescriptor() Method", Retrieved from: https://www.geeksforgeeks.org/javascript-object-getownpropertydescriptor-method/, Retrieved Date: Mar. 25, 2022, 6 Pages.
"JavaScript ES5 Object Methods", Retrieved from: https://web.archive.org/web/20210808080122/https://www.w3schools.com/jS/js_object_es5.asp, Aug. 8, 2021, 10 Pages.
"JavaScript Object Prototypes", Retrieved from: https://web.archive.org/web/20220323063659/https://www.w3schools.com/js/js_object_prototypes.asp, Mar. 23, 2022, 9 Pages.
"Minification (programming)", Retrieved from: https://en.wikipedia.org/wiki/Minification_(programming), Mar. 24, 2022, 3 Pages.
"Object.defineProperty()", Retrieved from: https://web.archive.org/web/20220324062018/https://developer.mozilla.org/en-US/docs/web/javascript/reference/global_objects/object/defineproperty, Mar. 24, 2022, 8 Pages.
"Object.getOwnPropertyDescriptors()", https://web.archive.org/web/20211209034826/https://developer.mozilla.org/en-US/docs/Web/JavaScript/Reference/Global_Objects/Object/getOwnPropertyDescriptors, Dec. 9, 2021, 3 Pages.
"Rewriter", Retrieved from: http://web.archive.org/web/20210126051140/https://pywb.readthedocs.io/en/latest/manual/rewriter.html, Jan. 26, 2021, 4 Pages.
"Rewrites", Retrieved from: http://web.archive.org/web/20210717095614/https://nextjs.org/docs/api-reference/next.config.js/rewrites, Jul. 17, 2021, 14 Pages.
"Sanitize/Rewrite HTML on the Client Side", Retrieved from: https://exceptionshub.com/sanitize-rewrite-html-on-the-client-side.html, Nov. 16, 2021, 11 Pages.
Durieux, et al., "Fully Automated HTML and JavaScript Rewriting for Constructing a Self-healing Web Proxy", In Journal of Software Testing Verification and Reliability, vol. 30, Issue 2, Mar. 2018, 12 Pages.
Heiderich, Mario, "Locking the Throne Room", Retrieved from: https://owasp.org/www-pdf-archive/Mario_Heiderich_OWASP_Sweden_Locking_the_throneroom.pdf, 2011, 40 Pages.
Kreymer, et al., "webrecorder / pywb", Retrieved from: http://web.archive.org/web/20211123050741/https://github.com/webrecorder/pywb/blob/main/docs/manual/rewriter.rst, Nov. 23, 2021, 4 Pages.
Kreymer, et al., "webrecorder/Wombat", Retrieved from: https://github.com/webrecorder/wombat/, Dec. 13, 2021, 3 Pages.

* cited by examiner

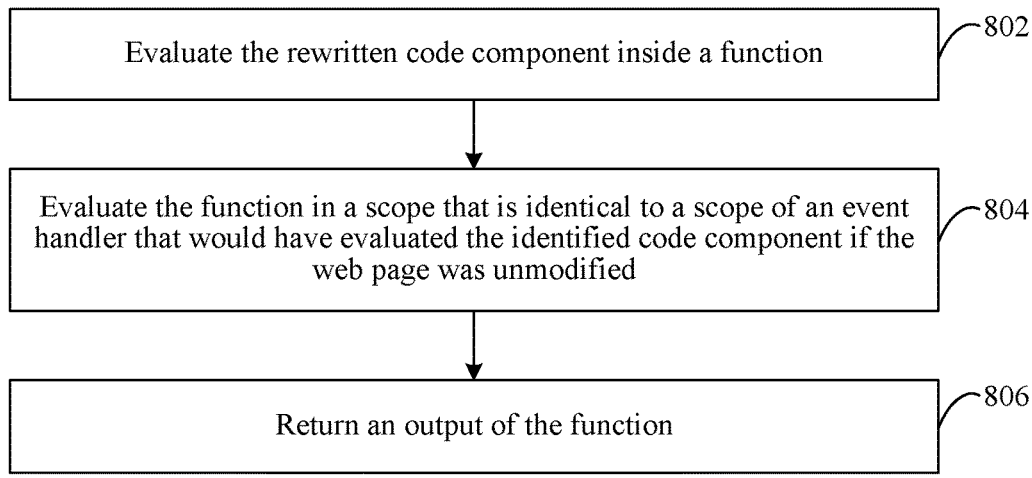

SYSTEM AND METHOD FOR CLIENT-SIDE REWRITING OF CODE INCLUDED IN A WEB PAGE

BACKGROUND

A cloud access security broker (CASB) is a web proxy that sits between a web server executing on a server computing device and a web browser executing on a client computing device to monitor interactions between the two sides and enforce security policies during these interactions. For example, the web proxy may be able to intercept resource requests emanating from a web browser and, based on a series of access control protocols, manage what a user of the web browser can access and interact with in regard to a particular set of resources. Furthermore, the web proxy can collect important information about user traffic within a computing ecosystem, which can provide valuable insights for detecting, diagnosing, and remedying possible security breaches.

A conventional CASB web proxy may be configured to modify code (e.g., JavaScript® code) included in a web page that it receives from a web server before it passes the web page to a web browser executing on a client computing device. For example, a web proxy may be configured to inject into a web page code that detects actions happening on the client side that should be subject to policy evaluation (e.g., a file upload or download that transpires entirely in the web browser without involvement by the web server). As another example, a web proxy may be configured to modify code included in a web page in order to suffix or un-suffix uniform resource locators (URLs) referenced therein.

A conventional approach to modifying code included in a web page involves the web proxy parsing the code included in the web page, identifying code of interest, and rewriting the code of interest included in the web page before sending the web page to the client computing device. The parsing, identifying, and rewriting of code included in the web page is a resource-intensive task that may consume a significant amount of time, particularly when the size of the code is large. This can adversely impact the ability of the CASB to quickly deliver web pages. As a CASB service expands to more and more users, this task can become a significant bottleneck for the CASB. However, implementing mitigating solutions at the CASB to address the bottleneck (e.g., caches, cache distribution, load balancing) would require still additional resources and may not fully address the problem.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are described herein for enabling client-side rewriting of code included in a web page. In one aspect, a proxy computing device is interconnected between a client computing device and a server computing device. The proxy computing device receives a web page from the server computing device. The proxy computing device analyzes the web page to identify a code component included therein. The proxy computing device generates a modified version of the web page by replacing the identified code component with a wrapped code component and including a code rewriting and evaluation function in the web page. The wrapped code component includes a call to the code rewriting and evaluation function. The call to the code rewriting and evaluation function includes the identified code component as an argument thereof. The code rewriting and evaluation function is configured to rewrite the identified code component that is included in the call from the wrapped code component to generate a rewritten code component and to evaluate the rewritten code component. The proxy computing device sends the modified version of the web page to the client computing device.

In a further example aspect, a client computing device sends a request for a web page to a proxy computing device. Responsive to sending the request, the client computing device receives a modified version of the web page from the proxy computing device. The modified version of the web page includes a code rewriting and evaluation function that is not included in the web page and a wrapped code component that replaces a code component in the web page. The code rewriting and evaluation function is configured to rewrite code that is passed thereto and to evaluate the rewritten code. The wrapped code component comprises a call to the code rewriting and evaluation function, the call to the code rewriting and evaluation function including the code component as an argument thereof.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 8 depicts a flowchart of a process for evaluating rewritten code in a manner dependent on an assigned source type being an event attribute source type, according to an example embodiment.

FIG. 9 depicts a flowchart of a process for evaluating rewritten code in a manner dependent on an assigned source type being a script element source type, according to an example embodiment.

Figure 1:
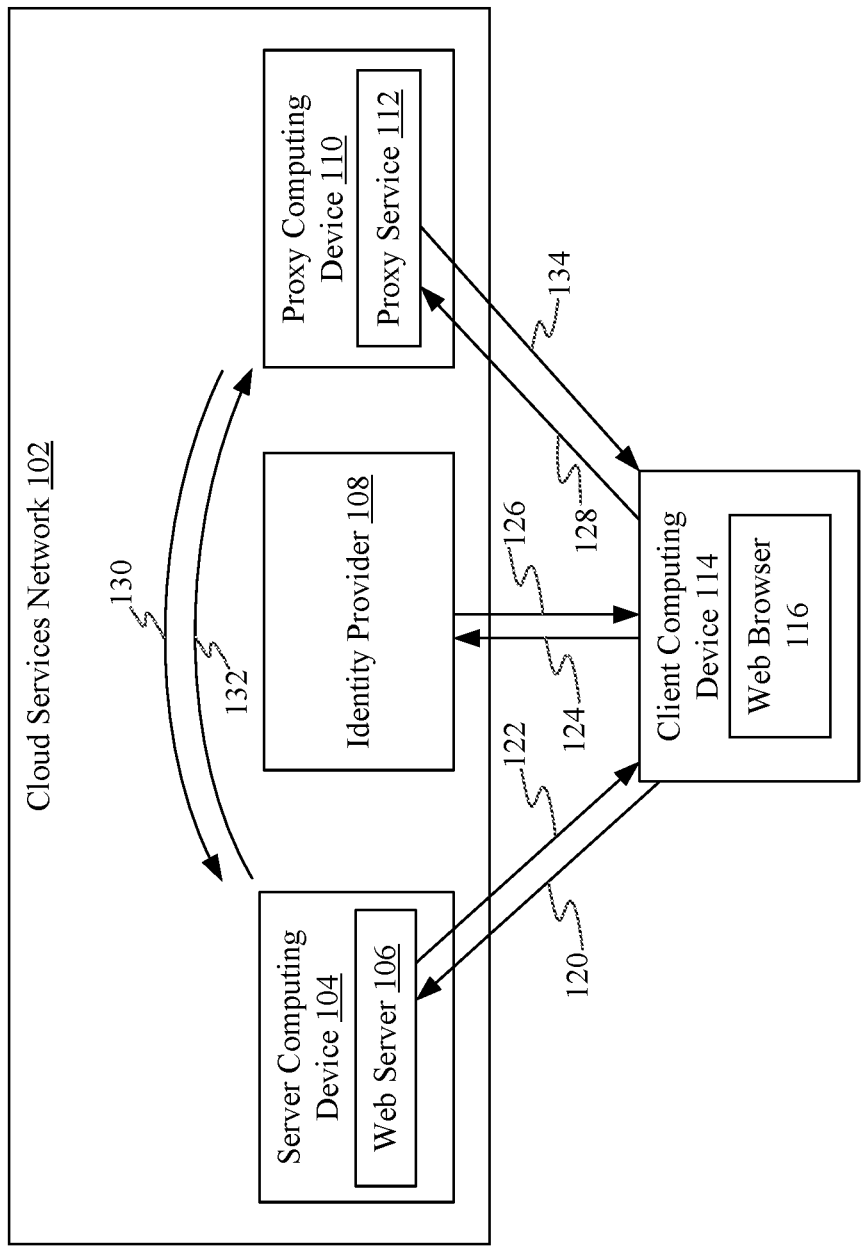
FIG. 1 is a block diagram of an example system that enables redirection of requests directed to a web server to a proxy service, in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Client-Side Rewriting of Code Included in a Web Page As discussed in the Background Section above, a CASB web proxy may be configured to modify code (e.g., JavaScript code) included in a web page that it receives from a web server before it passes the web page to a web browser executing on a client computing device. A conventional solution involves the web proxy parsing the code included in the web page, identifying code of interest, and rewriting the code of interest included in the web page before sending the web page to the client computing device. The parsing, identifying, and rewriting of code included in the web page is a resource-intensive task that may consume a significant amount of time, particularly when the size of the code is large. This can adversely impact the ability of the CASB to quickly deliver web pages. As a CASB service expands to more and more users, this task can become a significant bottleneck for the CASB. However, implementing mitigating solutions at the CASB to address the bottleneck (e.g., caches, cache distribution, load balancing) would require still additional resources and may not fully address the problem Additionally, some rewritten code included in a web page by a CASB web proxy may only be evaluated if a user performs a certain action with respect to the web page (e.g., clicks a button on the web page). Consequently, it is possible that code that is rewritten by the web proxy may never be evaluated on the client side. However, the web proxy must nevertheless rewrite all of the code of interest included in a web page because such code could be evaluated on the client side, depending on the actions taken by the user. This approach is thus inherently inefficient as it requires the web proxy to rewrite code that may never be evaluated on the client side.

A system and method described herein enables client-side rewriting of code included in a web page. Embodiments described herein include a proxy computing device, interconnected between a client computing device and a server computing device, that receives a web page from the server computing device. The proxy computing device analyzes the web page to identify a code component included therein. The proxy computing device generates a modified version of the web page by replacing the identified code component with a wrapped code component and including a code rewriting and evaluation function in the web page. The wrapped code component includes a call to the code rewriting and evaluation function, and the call to the code rewriting and evaluation function includes the identified code component as an argument thereof. The code rewriting and evaluation function is configured to rewrite the identified code component that is included in the call from the wrapped code component to generate a rewritten code component and to evaluate the rewritten code component. The proxy computing device sends the modified version of the web page to the client computing device.

In accordance with this system and method, the rewriting of the identified code component is carried out by the client computing device rather than by the proxy computing device. Consequently, this approach represents an improvement over a conventional approach in which a CASB web proxy must rewrite the code of interest included in a web page, which as noted above can adversely impact the performance of a CASB. In a sense, the system and method enable the computational burden of rewriting the code to be distributed among the client computing devices that receive the web pages, rather than focusing the burden on the proxy computing device.

Furthermore, in certain embodiments of the system and method, the wrapped code component is evaluated by the client computing device only if a particular event occurs with respect to the modified web page. Consequently, the wrapped code component will only call the code rewriting and evaluation function if the particular event occurs. Since the identified code component will only be rewritten and evaluated by the client computing device if the particular event occurs, this feature beneficially conserves computing resources (e.g., processor cycles) of the client computing device.

In certain embodiments, a source type is assigned to the identified code component and is also included in the call to the code rewriting and evaluation function as an argument thereof, and the code rewriting and evaluation function is configured to evaluate the rewritten code in a manner that is dependent on the source type. This feature enables the code rewriting and evaluation function to take certain steps based on source type that ensure that the identified code component is evaluated within the function in a manner (e.g., with a scope) that is consistent with how the identified code component would have been evaluated if the web page were unmodified, thereby preventing errors in code execution.

To help illustrate the aforementioned systems and methods, FIG. 1 will now be described. In particular, FIG. 1 is a block diagram of an example system 100 that enables redirection of requests directed to a web server to a proxy service, in accordance with an embodiment. As shown in FIG. 1, system 100 includes a cloud services network 102 and a client computing device 114. As further shown in FIG. 1, cloud services network 102 includes a server computing device 104, an identity provider 108, and a proxy computing device 110. Server computing device 104 is configured to execute a web server 106, proxy computing device 110 is configured to execute a proxy service 112, and client computing device 114 is configured to execute a web browser 116.

In FIG. 1, web server 106 implements an application or service that is capable of serving resources to clients such as client computing device 114, wherein such resources include web pages. Although web server 106 is shown as being implemented on a single server computing device 104, in alternate embodiments web server 106 may be implemented on multiple server computing devices and/or one or more other computing devices.

Identity provider 108 is a computer-implemented system that is configured to create, maintain, and manage identity information associated with users while providing authentication services to relying web services. Identity provider 108 may be implemented, for example, on one or more server computing devices.

Proxy service 112 is a computer-implemented system that is configured to monitor and manage interactions between the application or service implemented by web server 106 and users thereof. Although proxy service 112 is shown as being implemented on a single proxy computing device 110, in alternate embodiments proxy service 112 may be implemented on multiple proxy computing devices and/or one or more other computing devices.

Each component of cloud services network 102 and client computing device 114 may be communicatively connected via one or more networks (not pictured in FIG. 1). These one or more networks may include, for example and without limitation, one or more of a local area network (LAN), a wide area network (WAN), a personal area network (PAN), a private network, a public network, a packet network, a circuit-switched network, a wired network and/or a wireless network.

Client computing device 114 may be any type of computing device, including a stationary or mobile computing device. Examples of a stationary computing device include but are not limited to a desktop computer, a personal computer (PC), a video game console, or a smart appliance (e.g., a smart television). Examples of a mobile computing device include but are not limited to a smart phone, a laptop computer, a notebook computer, a tablet computer, a netbook, or a wearable computing device (e.g., a smart watch, a head-mounted device including smart glasses such as Google® Glass™, etc.)

As depicted in FIG. 1, web browser 116 of client computing device 114 may submit a request to web server 106 of server computing device 104 that requests a resource thereof. The request may be submitted, for example, on behalf of a user of client computing device 114.

In response to receiving request 120, web server 106 may determine that the user has not yet been authenticated and may therefore provide a response 122 to web browser 116 that causes web browser 116 to send a request 124 to identity provider 108 for user authentication. For instance, web server 106 may redirect web browser 116 to identity provider 108 in response to determining that a required authentication artifact (e.g., a token) was not provided with request 120.

After receiving request 124, identity provider 108 may determine based on an access policy whether web browser 116 should access the resource via proxy service 112. An access policy may outline which users or groups of users' and what web services' network cloud traffic should be routed to proxy service 112 for monitoring and/or management. In embodiments, an information technology (IT) administrator for an organization may set access policies for applications and users of client computing devices that access a computer network of the organization. For example, identity provider 108 may evaluate a user's login (e.g., username and password) and determine that there is a policy associated with that user that indicates that the user should access the resource via proxy service.

Identity provider 108 may further authenticate the user associated with request 124 and create an authentication artifact (e.g., a token) that can be used by web server 106 to determine whether the user should be granted access to the resource. In some embodiments, during authentication, a user may be prompted by identity provider 108 to provide his or her user login credentials. After determining that web browser 116 should access the resource via proxy service 112, identity provider 108 may send a response 126 to web browser 116 that includes an encrypted version of the authentication artifact and that redirects web browser 116 to send a request 128 to proxy service 112 that includes such encrypted authentication artifact.

After receiving redirected request 128, proxy service 112 may decrypt the authentication artifact and then generate a corresponding request 130 that includes the decrypted authentication artifact and provide it to web server 106. Web server 106 may grant or deny access to the resource based on the authentication artifact. If access is granted, web server 106 may interpret request 130, generate a response 132 to request 130, and issue response 132 to proxy service 112. In some embodiments, response 132 may include a file stored on web server 106 or an output from a program executing on web server 106. In other embodiments, response 132 may include an error message if the request could not be fulfilled.

After receiving response 132, proxy service 112 may generate a response 134 (e.g., a response that includes a web page) and send it to web browser 116. In response to receiving response 134, web browser 116 may interpret response 134 and display contents of response 134 (e.g., when response 134 includes a web page) on a window of web browser 116 for the user of client computing device 114. Response 134 may be the same as response 132 or a response modified by proxy service 112 (as discussed in greater detail herein). Any further requests related to accessing resource of web server 106 and originating in web browser 116 during the user's proxy session may be directed to proxy service 112, and any responses generated by proxy service 112 to the further requests may be issued to web browser 116 by proxy service 112 on behalf of web server 106.

In some embodiments, proxy service 112 may be configured to act as a suffix proxy. Suffix proxies enable a user to access content via a proxy server by appending the name of the proxy server to a domain URL of the requested content. For example, if a web page identifies a content source using the domain URL "targetapplication.com", proxy service 112 may rename the domain URL such that it instead appears as domain URL "targetapplication.com.proxyserver".

Figure 2:
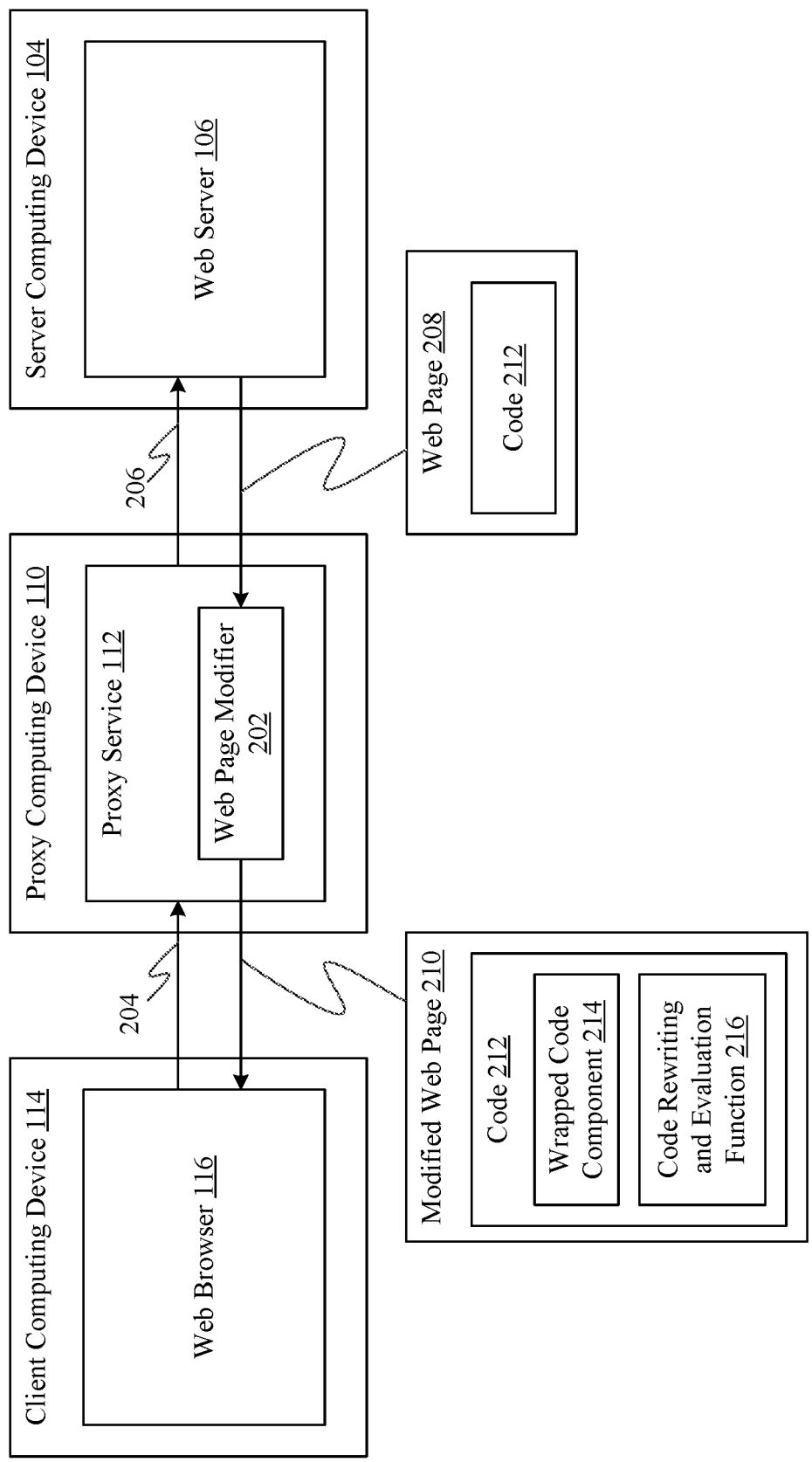
FIG. 2 is a block diagram of an example system in which a proxy computing device is interconnected between a client computing device and a server computing device, where the proxy computing device executes a proxy service, the client computing device executes a web browser, and the server computing device executes a web server, in accordance with an embodiment.

To help further illustrate the features of proxy service 112 in accordance with embodiments, FIG. 2 will now be described. In particular, FIG. 2 is a block diagram of an example system 200 in which a proxy computing device is interconnected between a client computing device and a server computing device, where the proxy computing device executes a proxy service, the client computing device executes a web browser, and the server computing device executes a web server, in accordance with an embodiment. As shown in FIG. 2, system 200 includes: client computing device 114, proxy computing device 110, and server computing device 104, as described above with respect to FIG. 1. As further shown in FIG. 2, proxy computing device 110 includes proxy service 112, as described in FIG. 1, which includes a web page modifier 202 that receives a web page 208 and outputs a modified web page 210. Web page 208 includes code 212 while modified web page 210 includes code 212 with a wrapped code component 214 and a code rewriting and evaluation function 216, as described further below.

As discussed above in reference to FIG. 1, proxy computing device 110 is communicatively interconnected between client computing device 114 and server computing device 104 via one or more networks (not pictured in FIG. 2). Proxy computing device 110 may establish itself as an intermediary for client computing device 114 and server computing device 104 in accordance with the process described above in reference to FIG. 1.

Proxy service 112 running on proxy computing device 110 may be configured to manage messages (e.g., requests and/or responses) sent between web browser 116 and web server 106. For example, proxy service 112 receives request 204 sent from web browser 116. In an embodiment, proxy service 112 may receive request 204 responsive to an identity provider having determined based on an access policy that request 204 should be redirected to proxy service 112. For example, the identity provider may identify an access policy associated with a user of client computing device 114 and/or a policy associated with an application or service that the user is trying to access that indicates that interactions between the user and the application or service should be conducted via proxy service 112. As such, any requests sent from web browser 116 to web server 106 will be redirected to proxy service 112 during the user's active proxy session.

Web page modifier 202 of proxy service 112 may be configured to modify messages sent between web server 106 and web browser 116. For example, in response to receiving request 204 from web browser 116, proxy service 112 may issue a corresponding request 206 to web server 106, requesting that web server 106 fulfill request 204. Proxy service 112 then receives a response corresponding to request 206 from web server 106 that includes a web page 208. After receiving the response including web page 208, web page modifier 202 may modify web page 208 and send a response including a modified web page 210 to web browser 116.

More specifically, in accordance with embodiments described herein, web page modifier 202 may modify code 212 of web page 208. Code 212 may include code components that implement various actions of interest to proxy service 112 from a monitoring and/or management perspective, such as navigation actions, file download actions, file upload actions, asynchronous JavaScript and XML (AJAX) actions, and/or any other actions that may be executed by web browser 116 of client computing device 114 responsive to displaying web page 208 and/or responsive to a user's interactions therewith. In particular, web page modifier 202 may generate modified web page 210 by replacing certain code components of code 212 of web page 208 with corresponding wrapped code components and by including code rewriting and evaluation function 216 into web page 208.

By way of example, code 212 of web page 208 may include a code component that prompts a download event of client-side generated content at client computing device 114 without communicating with web server 106. Web page modifier 202 may generate modified web page 210 by replacing this original code component with a wrapped code component 214 and including code rewriting and evaluation function 216 in the web page. Wrapped code component 214 includes a call to code rewriting and evaluation function 216 that includes the original code component as an argument thereof. Code rewriting and evaluation function 216 is configured to rewrite the original code component that is included in the call from wrapped code component 214 and to evaluate the rewritten code component. In this way, if a user of client computing device 114 interacts with modified web page 210 on client computing device 114 in a way that would normally have triggered evaluation of the original code component, wrapped code component 214 will instead be evaluated. In this case, evaluation of wrapped code component 214 will cause the original code component to be passed to code rewriting and evaluation function 216, and code rewriting and evaluation function 216 will rewrite the original code component and then evaluate the rewritten version of the original code component.

While a single wrapped code component 214 is shown in FIG. 2, it is contemplated that code 212 of modified web page 210 may include multiple wrapped code components. For example, code 212 may include a wrapped code component for each code component of code 212 that is deemed of interest to proxy service 112, and thus targeted for client-side rewriting and evaluation by code rewriting and evaluation function 216.

Figure 3:
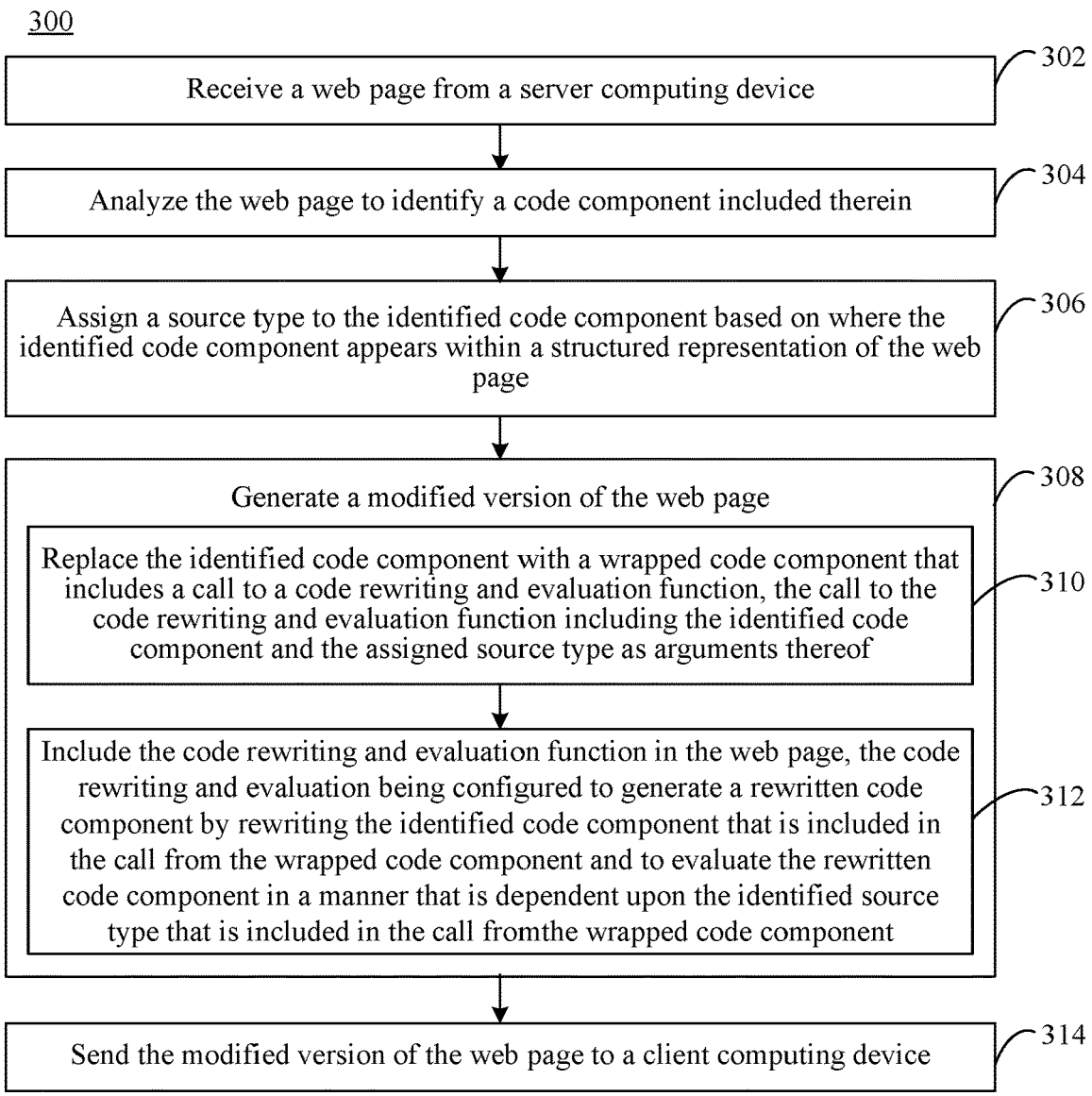
FIG. 3 depicts a flowchart of a process for modifying a web page, in accordance with an embodiment.

To further illustrate the foregoing features of proxy service 112, FIG. 3 is described. FIG. 3 depicts a flowchart 300 of a process for modifying a web page, in accordance with an embodiment. Proxy computing device 110 may operate according to flowchart 300 in embodiments. Note that not all steps of flowchart 300 need be performed in embodiments. Further structural and operational embodiments will be apparent to persons skilled in the relevant art(s) based on the following description of FIG. 3. FIG. 3 is described as follows with reference to system 200 of FIG. 2.

Flowchart 300 begins at step 302. In step 302, a web page is received from a server computing device. For instance, proxy service 112 running on proxy computing device 110 may receive web page 208 from web server 106 of server computing device 104. Web page 208 may be received in response to proxy service 112 having sent request 206, although this is only an example. Web page 208 includes code 212 (e.g., JavaScript code), which may include one or more code components for implementing various actions as described elsewhere herein.

In step 304, the web page is analyzed to identify a code component included therein. For instance, web page modifier 202 may analyze code 212 of web page 208 to identify a code component included therein. Depending on the implementation, web page modifier 202 may identify a code component that implements an action of interest to proxy service 112, such as a navigation action, a file download action, a file upload action, an AJAX action, and/or any other action that may be of interest to proxy service 112.

In step 306, a source type is assigned to the identified code component based on where the identified code component appears within a structured representation of the web page. For instance, web page modifier 202 of FIG. 2 may be configured to assign a source type to the code component identified in step 304 based on where the identified code component appears within a structured representation of web page 208.

For example, web page modifier 202 may assign to the identified code component one of a URL-specifying attribute source type, an event attribute source type, or a script element source type depending on where the identified code component appears within a structured representation (e.g., an HTML representation) of web page 208.

In further accordance with this embodiment, web page modifier 202 may assign a URL-specifying attribute source type to the identified code component in response to determining that the identified code component is included in a value of an attribute that is associated with an element of web page 208 and that specifies a URL. For example, web page modifier 202 analyzes the following code:

<a href="JS-CODE"></a>;

In this example, web page modifier 202 identifies "JS-CODE" as the identified code component in step 304. In step 306, web page modifier 202 assigns a URL-specifying attribute source type to "JS-CODE" since "JS-CODE" is included in the value of the href attribute that is associated with the <a> element of web page 208.

In further accordance with this embodiment, web page modifier 202 may assign an event attribute source type to the identified code component in response to determining that the identified code component is included in a value of an event attribute that is associated with an element of web page 208. For example, web page modifier 202 may analyze the following code:

<button onclick="JS-CODE"></button>;

In this example, web page modifier 202 identifies "JS-CODE" as the identified code component in step 304. In step 306, web page modifier 202 assigns an event attribute source type to "JS-CODE" since "JS-CODE" is included in the value of the onclick event attribute associated with the <button> element of web page 208.

In still further accordance with this embodiment, web page modifier 202 may assign a script element source type to the identified code component in response to determining that the identified code component is included in a script element of web page 208. For example, web page modifier 202 may analyze the following code:

<script>JS-CODE</script>;

In this example, web page modifier 202 identifies "JS-CODE" as the identified code component in step 304. In step 306, web page modifier 202 assigns a script element source type to "JS-CODE" since "JS-CODE" is included in the <script> element of web page 208.

In step 308, a modified version of the web page is generated. For example, web page modifier 202 of FIG. 2 generates a modified version of web page 208 which is modified web page 210. As shown in FIG. 3, step 308 comprises two sub-steps—namely step 310 and step 312.

In step 310, the identified code component is replaced with a wrapped code component. The wrapped code component includes a call to a code rewriting and evaluation function. The call to the code rewriting and evaluation function includes the identified code component and the assigned source type as arguments thereof. For instance, web page modifier 202 replaces the code component identified in step 304 with wrapped code component 214. Wrapped code component 214 includes a call to code rewriting and evaluation function 216 that includes the code component identified in step 304 and the source type assigned in step 306 as arguments thereof.

In step 312, the code rewriting and evaluation function is included in the web page. The code rewriting and evaluation function is configured to rewrite the identified code component that is included in the call from the wrapped code component to generate a rewritten code component and to evaluate the rewritten code component in a manner that is dependent upon the identified source type that is included in the call from the wrapped code component. For instance, web page modifier 202 of FIG. 2 includes code rewriting and evaluation function 216 in web page 208. In embodiments, web page modifier 202 may include code rewriting and evaluation function 216 in web page 208 by directly inserting the function in web page 208 or by including a reference to the function that causes client computing device 214 to load it into modified web page 210 (e.g., when web browser 116 renders modified web page 210). The reference to code rewriting and evaluation function 216 may be a prompt to load a file (e.g., a library, a JavaScript file, and/or the like) that includes code rewriting and evaluation function 216, and/or any other reference suitable for including code rewriting and evaluation function 216 in modified web page 210.

Figure 7:
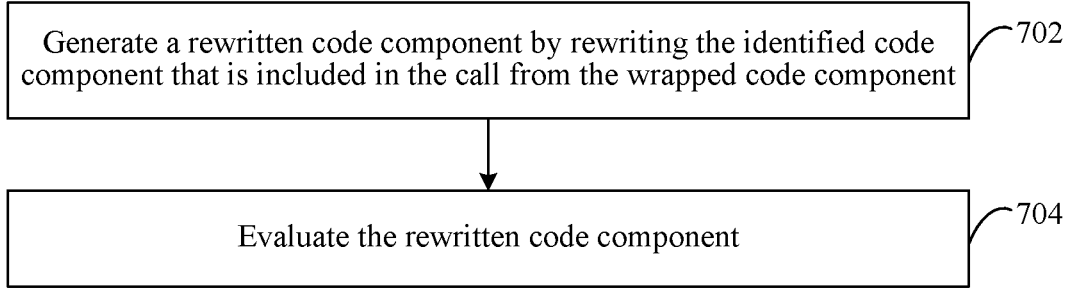
FIG. 7 depicts a flowchart of a process for rewriting and evaluating code, according to an example embodiment.

Examples of wrapped code component 214, code rewriting and evaluation function 216, and the manner in which they operate will be discussed further below with respect to FIGS. 7-9.

In step 314, the modified version of the web page is sent to a client computing device. For example, web page modifier 202 of FIG. 2 is configured to send modified web page 210 to web browser 116 running on client computing device 114.

Figure 4:
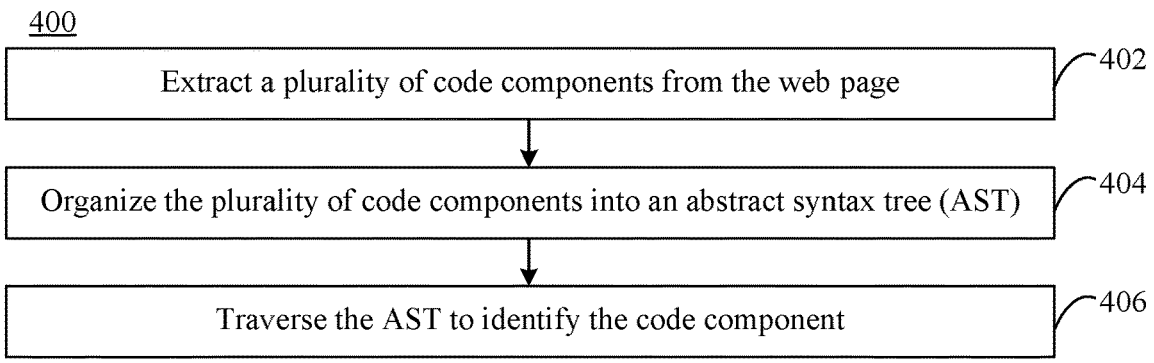
FIG. 4 depicts a flowchart of a process for analyzing a web page to identify a code component included therein, according to an example embodiment.

Web page modifier 202 may analyze web page 208 to identify a code component included therein in various ways, in embodiments. For example, FIG. 4 depicts a flowchart 400 of a process for analyzing a web page to identify a code component included therein, according to an example embodiment. Web page modifier 202 may operate according to flowchart 400 in embodiments. Flowchart 400 is a further embodiment of step 304 of flowchart 300, as shown and described with respect to FIG. 3. Note that not all steps of flowchart 400 need be performed in embodiments. Further structural and operational embodiments will be apparent to persons skilled in the relevant art(s) based on the following description of FIG. 4. FIG. 4 is described as follows with reference to system 200 of FIG. 2.

Flowchart 400 begins at step 402. In step 402, a plurality of code components are extracted from the web page. For example, web page modifier 202 of FIG. 2 may be configured to extract a plurality of code components from code 212 of web page 208.

In step 404, the plurality of code components are organized into an abstract syntax tree (AST). For example, web page modifier 202 of FIG. 2 may be configured to organize the plurality of code components extracted in step 402 into an AST. An AST is a tree representation of the abstract syntactic structure of code (e.g., code 212) written in a programming language. Each node of the AST may denote a construct occurring in the code, and connections between nodes may signify dependencies between such constructs.

In step 406, the AST is traversed to identify the code component. For example, web page modifier 202 of FIG. 2 may be configured to traverse the AST organized in step 404 to identify nodes that are of interest to proxy service 112 from a management or monitoring perspective and thus targeted for replacement with wrapped code components.

Figure 5:
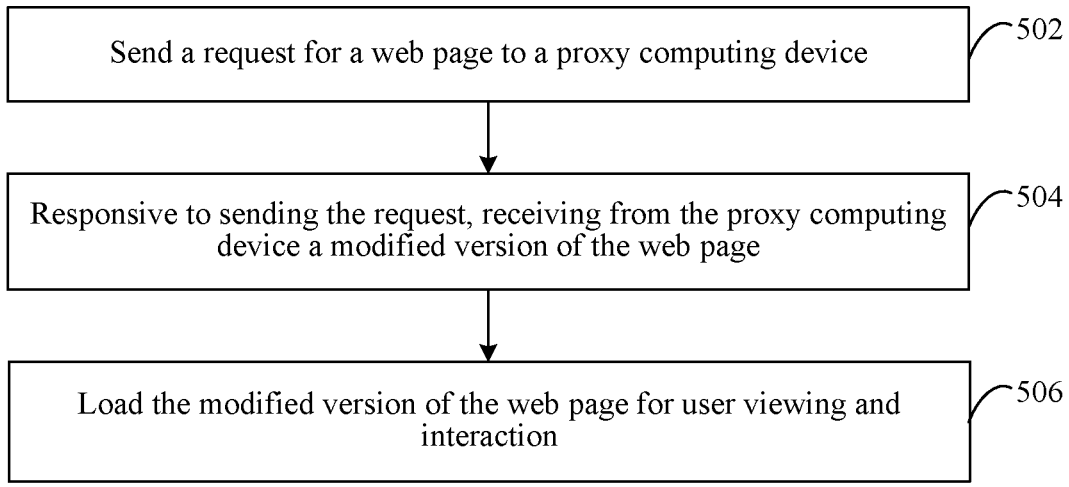
FIG. 5 depicts a flowchart of a process for loading a modified version of a web page, according to an example embodiment.

Web browser 116 running on client computing device 114 may request and load web pages in various ways, in embodiments. FIG. 5 depicts a flowchart 500 of a process for loading a modified version of a web page, according to an example embodiment. Client computing device 114 may operate according to flowchart 500 in embodiments. Note that not all steps of flowchart 500 need be performed in embodiments. Further structural and operational embodiments will be apparent to persons skilled in the relevant art(s) based on the following description of FIG. 5. FIG. 5 is described as follows with reference to system 200 of FIG. 2.

Flowchart 500 begins at step 502. In step 502, a request for a web page is sent to a proxy computing device. For example, web browser 116 running on client computing device 114 is configured to send request 204 for a web page to proxy service 112 running on proxy computing device 110, as shown and described with respect to FIG. 2. In accordance with an embodiment, request 204 may further include client-side generated content and/or metadata associated with client computing device 114 and/or web browser 116.

In step 504, responsive to sending the request, a modified version of the web page is received from the proxy computing device. For example, and with continued reference to FIG. 2, web browser 116 running on client computing device 114 is configured to receive modified web page 210 from proxy service 112 running on proxy computing device 110. By virtue of the operation of web page modifier 202 (as discussed above), modified web page 210 includes wrapped code component 214 and code rewriting and evaluation function 216, but these entities are not included in the web page requested in step 502 (e.g., web page 208). As noted above, wrapped code component 214 replaces a code component in the web page requested in step 502 (e.g., web page 208). Wrapped code component 214 includes a call to code rewriting and evaluation function 216. The call to code rewriting and evaluation function 216 includes the code component as an argument thereof. Code rewriting and evaluation function 216 is configured to rewrite code that is included in the call from the wrapped code component 214 and to evaluate the rewritten code.

In step 506, the modified version of the web page is loaded for user viewing and interaction. For example, and with continued reference to FIG. 2, web browser 116 is configured to load modified web page 210 for viewing and interaction by a user of client computing device 114. In an embodiment in which only a reference to code rewriting and evaluation function 216 is included in modified web page 210, when web browser 116 loads (e.g., renders) modified web page 210, web browser 116 requests a file that includes code rewriting and evaluation function 216 from proxy service 112. Responsive to receiving the file, web browser 116 loads code rewriting and evaluation function 216 into modified web page 210. In a further embodiment, responsive to receiving the file, web browser 116 stores the file in a browser cache (not pictured in FIG. 2). In this context, further requests for the file may be directed to the browser cache without having to communicate with proxy service 112.

Figure 6:
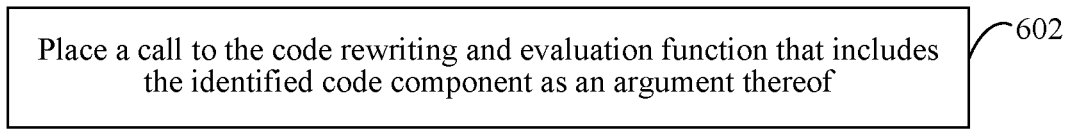
FIG. 6 depicts a flowchart of a process for placing a call to a code rewriting and evaluation function, according to an example embodiment.

In order to rewrite and evaluate code at client computing device 114, wrapped code component 214 includes a call to code rewriting and evaluation function 216. To help further explain this, FIG. 6 will now be described. FIG. 6 depicts a flowchart 600 of a process for placing a call to a code rewriting and evaluation function, according to an example embodiment. Wrapped code component 214 may be configured to call code rewriting and evaluation function 216 according to flowchart 600 in embodiments. Furthermore, client computing device 114 may prompt wrapped code component 214 to call code rewriting and evaluation function 216 according to flowchart 600 in embodiments (e.g., by evaluating the call included in wrapped code component 214). Note that flowchart 600 need not be performed in embodiments. Further structural and operational embodiments will be apparent to persons skilled in the relevant art(s) based on the following description of FIG. 6. FIG. 6 is described as follows with reference to system 200 of FIG. 2.

Flowchart 600 includes step 602. In step 602, a call is placed to the code rewriting and evaluation function that includes the identified code component as an argument thereof. For example, wrapped code component 214 of FIG. 2, when evaluated (e.g., by web browser 116), places a call to code rewriting and evaluation function 216 that passes (e.g., as an argument) the code component identified in step 304 of flowchart 300 of FIG. 3. In accordance with an embodiment, the call to code rewriting and evaluation function 216 may also pass (e.g., as an argument) the source type assigned in step 306 of flowchart 300. In embodiments, wrapped code component 214 may be evaluated when web browser 116 renders modified web page 210 or may be evaluated only after web browser 116 renders modified web page 201 and a particular event occurs with respect to modified web page 210 (e.g., a user of client computing device 114 interacts with modified web page 210 in a particular way (e.g., changing an element, clicking a button, mousing over an element, mousing away from an element, pushing a keyboard key), and/or any other type of event associated with modified web page 210, as described elsewhere herein and/or as would otherwise be understood by a person of relevant skill(s) having benefit of this disclosure).

Whether wrapped code component 214 is evaluated when modified web page 210 is loaded may depend on the source type assigned to the identified code component that wrapped code component 214 replaced (e.g., the source type assigned by web page modifier 202, as described with respect to step 306 of flowchart 300 of FIG. 3). For example, a first wrapped code component corresponding to an identified code component assigned a URL-specifying attribute source type and a second wrapped code component corresponding to an identified code component assigned a script element source type may be evaluated when web browser 116 loads modified web page 210; however, a third wrapped code component corresponding to an identified code component assigned an event attribute source type may not be evaluated until the event associated with the identified code component is triggered. In this context, the third wrapped code component may not be evaluated if the event never occurs. Thus, computing resources are not expended rewriting the third identified code component and evaluating the rewritten third identified code component if the event associated with the third wrapped component does not occur.

In order to rewrite and evaluate code at client computing device 114, the code component identified by proxy computing device 110 is passed to code rewriting and evaluation function 216. To help illustrate this, FIG. 7 will now be described. FIG. 7 depicts a flowchart 700 of a process for rewriting and evaluating code, according to an example embodiment. Code rewriting and evaluation function 216 may be configured to rewrite and evaluate code (e.g., the identified code component) according to flowchart 700 in embodiments. Furthermore, client computing device 114 may prompt code rewriting and evaluation function 216 to rewrite and evaluate code according to flowchart 700 in embodiments (e.g., by evaluating the call included in wrapped code component 214). Note that not all steps of flowchart 700 need be performed in embodiments. Further structural and operational embodiments will be apparent to persons skilled in the relevant art(s) based on the following description of FIG. 7. FIG. 7 is described as follows with reference to system 200 of FIG. 2.

Flowchart 700 begins at step 702. In step 702, the identified code component that is included in the call from the wrapped code component is rewritten to generate a rewritten code component. For example, responsive to wrapped code component 214 placing a call to code rewriting and evaluation function 216, code rewriting and evaluation function 216 generates a rewritten code component by rewriting the identified code component included in the call from wrapped code component 214. In embodiments, code rewriting and evaluation function 216 may rewrite the identified code component in various ways. For example, code rewriting and evaluation function 216 may add or remove suffixes to URLs in the identified code component included in the call from wrapped code component 214, insert replacement functions (e.g., "hooks") into the identified code component included in the call from wrapped code component 214 that handle function calls, events, or messages, and/or otherwise modify the identified code component included in the call from wrapped code component 214. In accordance with an embodiment, a replacement function inspects a download event or upload event prompted by the identified code component included in the call from wrapped code component 214.

In step 704, the rewritten code component is evaluated. For example, code rewriting and evaluation function 216 evaluates the rewritten code component generated in step 702. In embodiments, code rewriting and evaluation function 216 may evaluate the rewritten code component based on an assigned source type, as will be discussed further below.

In embodiments, code rewriting and evaluation function 216 may rewrite identified code components included in the call from wrapped code component 214 as arguments thereof and evaluate the rewritten code in various ways. In accordance with an embodiment, the rewriting and evaluation of the rewritten code may proceed according to Example Code Rewriting and Evaluation Function ("CRE Function" herein) shown herein below:

| | Example Code Rewriting and Evaluation Function |
|---|---|
| 1: | function wrapped_eval(IdentifiedCode, source) { |
| 2: | switch (scriptSource){ |
| 3: | case 'JS_INLINER': |
| 4: | return Function(RewriteCodeFunction(IdentifiedCode)); |
| 5: | case 'JS_ATTR': |
| 6: | var withBlocks = 'with(document){with(this.form \|\| { }) {with(this) { ' + RewriteCodeFunction(IdentifiedCode) + ' }}}'; |
| 7: | return Function("event", withBlocks); |
| 8: | case 'SCRIPT_TAG': |
| 9: | const wrappedCode = RewriteCodeFunction(IdentifiedCode); |
| 10: | const newScript = document.createElement('script'); |
| 11: | const currentScript = document.currentScript; |
| 12: | newScript.text = wrappedCode; |
| 13: | const attributes = Array.from(currentScript.attributes); |
| 14: | for (const attribute of currentScript.attributes) { |
| 15: | newScript.setAttribute(attribute.name, attribute.value); |
| 16: | } |
| 17: | currentScript.before(newScript); |
| 18: | const elementToRemove = currentScript.isConnected ? currentScript : newScript; |
| 19: | elementToRemove.remove( ); |
| 20: | break; |
| 21: | } |
| 22: | } |

CRE Function includes a code rewriting and evaluation function "wrapped_eval( )" that accepts "IdentifiedCode" and "source" as arguments, where IdentifiedCode is the identified code component and "source" is the assigned source type included in the call from wrapped code component 214 (line 1 of CRE Function). A "switch" statement selects one of the "case" code blocks to evaluate (lines 2, 3, 5, and 8 of CRE Function).

If source is a URL-specifying attribute source type ('JS_INLINER'), a function "Function" is constructed to evaluate a call to a code rewriting function "RewriteCodeFunction( )" (line 4 of CRE Function). The call to RewriteCodeFunction passes IdentifiedCode to the code rewriting function to rewrite IdentifiedCode, as described elsewhere herein.

If source is an event attribute source type ('JS_ATTR'), the rewritten code is evaluated as will be described further below with respect to FIG. 8 (lines 5-7 of CRE Function). If source is a script element source type ('SCRIPT_TAG'), the rewritten code is evaluated as will be described further below with respect to FIG. 9 (lines 8-20 of CRE Function).

Upon completion of rewriting and evaluating IdentifiedCode, the output of wrapped_eval( ) is returned. In embodiments, code rewriting and evaluation functions such as CRE Function may select from other cases not shown in CRE Function corresponding to other assigned source types. In one particular embodiment, CRE Function may submit an error message if the assigned source type is not supported by wrapped_eval( ).

As discussed above with respect to CRE Function, code rewriting and evaluation function 216 may evaluate rewritten code dependent on an assigned source type included in the call from wrapped code component 214 as an argument thereof. For example, FIG. 8 depicts a flowchart 800 of a process for evaluating rewritten code in a manner dependent on an assigned source type being an event attribute source type, according to an example embodiment. Flowchart 800 may be an embodiment of step 704 of flowchart 700, as shown and described with respect to FIG. 7. Code rewriting and evaluation function 216 may be configured to evaluate rewritten code (and may evaluate rewritten code when called upon) according to flowchart 800 in embodiments. Note that not all steps of flowchart 800 need be performed in embodiments. Further structural and operational embodiments will be apparent to persons skilled in the relevant art(s) based on the following description of FIG. 8. FIG. 8 is described as follows with reference to system 200 of FIG. 2 and CRE Function. While FIG. 8 is described with respect to CRE Function, other code rewriting and evaluation functions may be used.

Flowchart 800 begins at step 802. In step 802, the rewritten code component is evaluated inside a function. For instance, CRE Function evaluates a call to RewriteCodeFunction( ) inside a function labeled "Function" (line 7 of CRE Function). In one particular embodiment, Function has a single argument named "event" and a function body string "withBlocks" (described further below with respect to step 804) that defines Function.

In step 804, the function is evaluated in a scope that is identical to a scope of an event handler that would have evaluated the identified code component if the web page was unmodified. For instance, in CRE Function, Function is evaluated in a scope that is identical to a scope of an event handler that would have evaluated the identified code component if the web page was unmodified.

In accordance with an embodiment, code rewriting and evaluation function 216 is configured to extend a scope chain for the evaluation of Function to at least include a scope of the element with which the event attribute is associated and a scope of a document object of modified web page 210. In accordance with a further embodiment, code rewriting and evaluation function 216 is configured to extend the scope chain for the evaluation of Function to include the scope of the element with which the event attribute is associated, the scope of a form element that is the parent of the element with which the event attribute is associated, and the scope of the document object of modified web page 210. For instance, in line 6 of CRE Function, the variable "withBlocks" is declared. withBlocks includes a call to RewriteCodeComponent( ) that passes IdentifiedCode thereto and nested with statements to extend the scope chain for the evaluation of Function to include the scope of an element "this" with which the event attribute is associated, the scope of a form element "form" that is the parent of element "this", and the scope of the document object "document".

In step 806, an output of the function is returned. For example, when CRE Function is evaluated, the output of Function is returned (line 7 of CRE Function). In accordance with an embodiment, if the output of Function returns "false", a default action of which the event attribute is associated with is prevent (e.g., by the event.preventDefault( ) method in a JavaScript implementation).

As discussed above with respect to CRE Function, code rewriting and evaluation function 216 may evaluate rewritten code dependent on an assigned source type included in the call from wrapped code component 214 as an argument thereof. For example, FIG. 9 depicts a flowchart 900 of a process for evaluating rewritten code in a manner dependent on an assigned source type being a script element source type, according to an example embodiment. Flowchart 900 may be an embodiment of step 704 of flowchart 700, as shown and described with respect to FIG. 7. Code rewriting and evaluation function 216 may evaluate rewritten code (and may evaluate rewritten code when called upon) according to flowchart 900 in embodiments. Note that not all steps of flowchart 900 need be performed in embodiments. Further structural and operational embodiments will be apparent to persons skilled in the relevant art(s) based on the following description of FIG. 9. FIG. 9 is described as follows with reference to system 200 of FIG. 2 and CRE Function. While FIG. 9 is described with respect to CRE Function, other code rewriting and evaluation functions may be used.

Flowchart 900 begins at step 902. In step 902, a new script element is created that includes the rewritten code component. For instance, in line 9 of CRE Function, a constant "wrappedCode" is set to a returned value of a call to RewriteCodeFunction( ). A new script element "newScript" is created (line 10 of CRE Function). The text of newScript is set to the rewritten code component (line 12 of CRE Function). In one particular embodiment, all attributes of a script element that includes the wrapped code component ("currentScript" in CRE Function) are copied into the new script element (lines 13-16 of CRE Function).

In step 904, the new script element is appended after the script element that includes the wrapped code component in the modified version of the web page, such that the rewritten code component will be evaluated by a web browser that displays the modified version of the web page. For instance, in line 17 of CRE Function, newScript is appended after currentScript, such that the rewritten code component will be evaluated by web browser 116 that displays modified web page 210.

In step 906, a determination of if the script element that includes the wrapped code component is attached to a document object of the modified version of the web page. For instance, line 18 of CRE Function includes a conditional operator that assigns a value of a constant "elementToRemove" based on determining if currentScript is attached to a document of modified web page 210. Responsive to determining that currentScript is attached to the document object of modified web page 210, flowchart 900 proceeds to step 908. Otherwise, responsive to determining that currentScript is not attached to the document object of modified web page 210, flowchart 900 proceeds to step 910.

In step 908, the script element that includes the wrapped code component is removed from the modified version of the web page. For instance, if CRE Function in line 18 assigns a value of "currentScript" to elementToRemove, an element.remove( ) method removes currentScript from modified web page 210 (line 19 of CRE Function).

In step 910, the new script element is removed from the modified version of the web page. For instance, if CRE Function in line 18 assigns a value of "newScript" to elementToRemove, the element.remove( ) method removes newScript from modified web page 210 (line 19 of CRE Function).

III. Further Example Embodiments and Advantages

As noted above, systems and devices may be configured in various ways for enabling rewriting of code components on a client computing device. Example embodiments have been described with respect to proxy services that manage communications between web servers and web browsers, however, it is also contemplated herein that a proxy server may manage communications between an application server of an application and a front-end component of the application. For example, the application may be of any type of network accessible application/service, such as a database application, a social networking application, a messaging application, a financial services application, a news application, a search application, a web-accessible productivity application, a cloud storage and/file hosting application, or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Computer System Implementation

Figure 10:
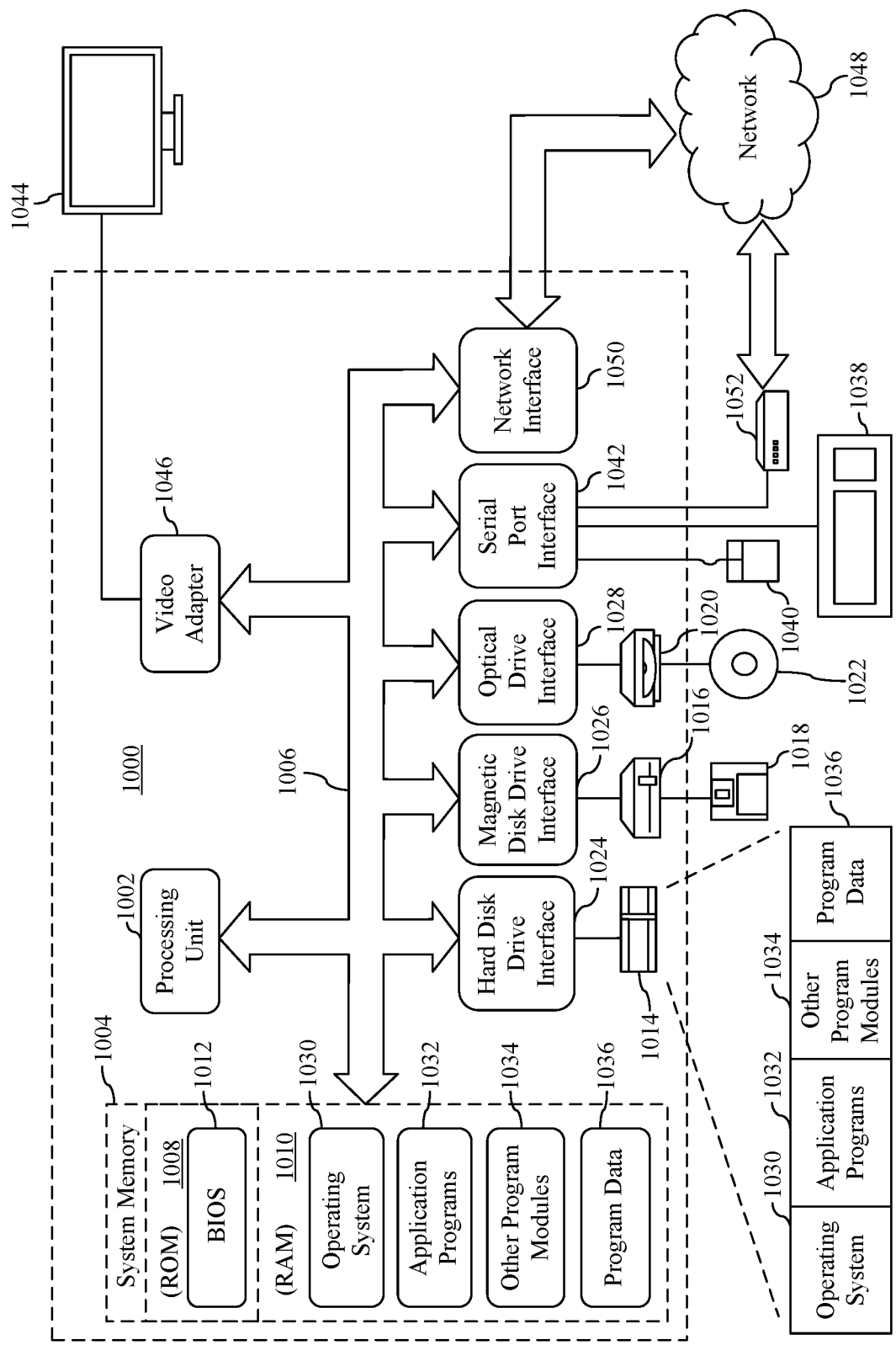
FIG. 10 is a block diagram of an example computing device that may be used to implement embodiments.

FIG. 10 depicts an example processor-based computer system 1000 ("system 1000" herein) that may be used to implement various embodiments described herein, such as any of the embodiments described in the Sections above and in reference to FIGS. 1-8. For example, system 1000 may be used to implement any of the components of systems 100 and 200 as described above in reference to FIGS. 1 and 2 as well as any of the flowcharts described above in reference to FIGS. 3-9. The description of system 1000 provided herein is provided for purposes of illustration and is not intended to be limiting. Embodiments may be implemented in further types of computer systems, as would be known to persons skilled in the relevant art(s).

As shown in FIG. 10, system 1000 includes one or more processors, referred to as processing unit 1002, a system memory 1004, and a bus 1006 that couples various system components including system memory 1004 to processing unit 1002. Processing unit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 1002 may execute program code stored in a computer readable medium, such as program code of operating system 1030, application programs 1032, other program modules 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other program modules 1034, and program data 1036. Application programs 1032 or other program modules 1034 may include, for example, computer program logic (e.g., computer program code or instructions) for implementing the systems described above, including the embodiments described in reference to FIGS. 1-9.

A user may enter commands and information into the system 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in, system 1000. Display screen 1044 may display information, as well as being a user interface for receiving user commands and/or other information (e.g., by touch, finger gestures, virtual keyboard, etc.). In addition to display screen 1044, system 1000 may include other peripheral output devices (not shown) such as speakers and printers.

System 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including system memory 1004 of FIG. 10). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1032 and other program modules 1034) may be stored on the hard disk, magnetic disk, optical disk, ROM, RAM, or other hardware storage medium. Such computer programs may also be received via network interface 1050, serial port interface 1052, or any other interface type. Such computer programs, when executed or loaded by an application, enable system 1000 to implement features of embodiments discussed herein. Accordingly, such computer programs represent controllers of the system 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Exemplary Embodiments

In an embodiment, a system includes a proxy computing device that is interconnected between a client computing device and a server computing device. The proxy computing device is configured to receive a web page from the server computing device. The proxy computing device is configured to analyze the web page to identify a code component included therein. The proxy computing device is configured to generate a modified version of the web page by replacing the identified code component with a wrapped code component and including a code rewriting and evaluation function in the web page. The wrapped code component includes a call to the code rewriting and evaluation function. The call to the code rewriting and evaluation function including the identified code component as an argument thereof. The code rewriting and evaluation function is configured to generate a rewritten code component by rewriting the identified code component that is included in the call from the wrapped code component and to evaluate the rewritten code component. The proxy computing device is configured to send the modified version of the web page to the client computing device.

In an embodiment, the proxy computing device is configured to analyze the web page to identify the code component by extracting a plurality of code components from the web page, organizing the plurality of code components into an abstract syntax tree (AST), and traversing the AST to identify the code component.

In an embodiment, the proxy computing device is configured to analyze the web page to identify the code component by analyzing the web page to identify a code component that implements one of: a navigation action, a file download action, or a file upload action.

In an embodiment, the identified code component includes a JavaScript code component.

In an embodiment, the proxy computing device is further configured to assign a source type to the identified code component based on where the identified code component appears within a structured representation of the web page. The call from the wrapped code component to the code rewriting and evaluation function further includes the assigned source type of the identified code component as an argument thereof. The code rewriting and evaluation function is configured to evaluate the rewritten code component in a manner that is dependent upon on the assigned source type of the identified code component that is included in the call from the wrapped code component.

In an embodiment, the proxy computing device is configured to assign the source type to the identified code component by: assigning a URL-specifying attribute source type to the identified code component in response to determining that the identified code component is included in a value of an attribute that is associated with an element of the web page and that specifies a URL; assigning an event attribute source type to the identified code component in response to determining that the identified code component is included in a value of an event attribute that is associated with an element of the web page; or assigning a script element source type to the identified code component in response to determining that the identified code component is included in a script element of the web page.

In an embodiment, the code rewriting and evaluation function is configured to perform the following when the assigned source type that is included in the call from the wrapped code component is the event attribute source type: evaluate the rewritten code component inside a function; evaluate the function in a scope that is identical to a scope of an event handler that would have evaluated the identified code component if the web page was unmodified; and return an output of the function.

In an embodiment, the code rewriting and evaluation function is configured to evaluate the function in the scope that is identical to the scope of the event handler that would have evaluated the identified code component if the web page was unmodified by extending a scope chain for the evaluation of the function to at least include a scope of the element with which the event attribute is associated and a scope of a document object of the modified version of the web page.

In an embodiment, the code rewriting and evaluation function is configured to perform the following when the assigned source type that is included in the call from the wrapped code component is the script element source type: create a new script element that includes the rewritten code component and copy all attributes of a script element that includes the wrapped code component into the new script element; append the new script element after the script element that includes the wrapped code component in the modified version of the web page, such that the rewritten code component will be evaluated by a web browser that displays the modified version of the web page; determine if the script element that includes the wrapped code component is attached to a document object of the modified version of the web page. Responsive to determining that the script element that includes the wrapped code component is attached to the document object of the modified version of the web page, the code rewriting and evaluation function is configured to remove the script element that includes the wrapped code component from the modified version of the web page. Responsive to determining that the script element that includes the wrapped code component is not attached to the document object of the modified version of the web page, the code rewriting and evaluation function is configured to remove the new script element from the modified version of the web page.

In an embodiment, a method is performed by a proxy computing device that is interconnected between a client computing device and a server computing device. The method includes receiving a web page from the server computing device. The web page is analyzed to identify a code component included therein. A modified version of the web page is generated by replacing the identified code component with a wrapped code component and including a code rewriting and evaluation function in the web page. The wrapped code component includes a call to the code rewriting and evaluation function. The call to the code rewriting and evaluation function includes the identified code component as an argument thereof. The code rewriting and evaluation function is configured to generate a rewritten code component by rewriting the identified code component that is included in the call from the wrapped code component and to evaluate the rewritten code component. The modified version of the web page is sent to the client computing device.

In an embodiment, analyzing the web page to identify the code component includes extracting a plurality of code components from the web page. The plurality of code components are organized into an abstract syntax tree (AST). The AST is traversed to identify the code component.

In an embodiment, analyzing the web page to identify the code component includes analyzing the web page to identify a code component that implements one of: a navigation action, a file download action, or a file upload action.

In an embodiment, the identified code component includes a JavaScript code component.

In an embodiment, the method further includes assigning a source type to the identified code component based on where the identified code component appears within a structured representation of the web page. The call from the wrapped code component to the code rewriting and evaluation function further includes the assigned source type of the identified code component as an argument thereof. The code rewriting and evaluation function is configured to evaluate the rewritten code component in a manner that is dependent upon on the assigned source type of the identified code component that is included in the call from the wrapped code component.

In an embodiment, assigning the source type to the identified code component includes one of: assigning a URL-specifying attribute source type to the identified code component in response to determining that the identified code component is included in a value of an attribute that is associated with an element of the web page and that specifies a URL; assigning an event attribute source type to the identified code component in response to determining that the identified code component is included in a value of an event attribute that is associated with an element of the web page; or assigning a script element source type to the identified code component in response to determining that the identified code component is included in a script element of the web page.

In an embodiment, the code rewriting and evaluation function is configured to perform the following when the assigned source type that is included in the call from the wrapped code component is the event attribute source type: evaluate the rewritten code component inside a function; evaluate the function in a scope that is identical to a scope of an event handler that would have evaluated the identified code component if the web page was unmodified; and return an output of the function.

In an embodiment, the code rewriting and evaluation function is configured to evaluate the function in the scope that is identical to the scope of the event handler that would have evaluated the identified code component if the web page was unmodified by extending a scope chain for the evaluation of the function to at least include a scope of the element with which the event attribute is associated and a scope of a document object of the modified version of the web page.

In an embodiment, the code rewriting and evaluation function is configured to perform the following when the assigned source type that is included in the call from the wrapped code component is the script element source type: create a new script element that includes the rewritten code component and copy all attributes of a script element that includes the wrapped code component into the new script element; and append the new script element after the script element that includes the wrapped code component in the modified version of the web page, such that the rewritten code component will be evaluated by a web browser that displays the modified version of the web page.

In an embodiment, the code rewriting and evaluation function is further configured to perform the following after the appending step when the assigned source type that is included in the call from the wrapped code component is the script element source type: determine if the script element that includes the wrapped code component is attached to a document object of the modified version of the web page. Responsive to determining that the script element that includes the wrapped code component is attached to the document object of the modified version of the web page, the code rewriting and evaluation function is further configured to remove the script element that includes the wrapped code component from the modified version of the web page. Responsive to determining that the script element that includes the wrapped code component is not attached to the document object of the modified version of the web page, the code rewriting and evaluation function is further configured to remove the new script element from the modified version of the web page.

In an embodiment, a method is performed by a client computing device. The method includes sending a request for a web page to a proxy computing device. Responsive to sending the request, a modified version of the web page is received from the proxy computing device. The modified version of the web page includes a wrapped code component that replaces a code component in the web page and a code rewriting and evaluation function that is not included in the web page. The wrapped code component includes a call to the code rewriting and evaluation function. The call to the code rewriting and evaluation function including the code component as an argument thereof. The code rewriting and evaluation function is configured to rewrite the code component that is included in the call from the wrapped code component and to evaluate the rewritten code.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
a proxy computing device that is interconnected between a client computing device and a server computing device, the proxy computing device comprising a processor and memory, the memory storing program code structured to cause the processor to:
receive a web page from the server computing device;
identify a code component included in the web page;
replace the identified code component with a wrapped code component that includes a call to a code rewriting and evaluation function, resulting in a modified version of the web page, the call to the code rewriting and evaluation function including the identified code component as an argument thereof; and
send the modified version of the web page to the client computing device, wherein sending the modified version of the web page causes the client computing device to execute the call to the code rewriting and evaluation function to generate a rewritten code component based on the identified code component included in the call and evaluate the rewritten code component.

2. The system of claim 1, wherein to identify the code component, the program code is structured to cause the processor to:
extract a plurality of code components from the web page;
organize the plurality of code components into an abstract syntax tree (AST); and
traverse the AST to identify the code component.

3. The system of claim 1, wherein to identify the code component, the program code is structured to cause the processor to:
identify a code component that implements one of:
a navigation action;
a file download action; or
a file upload action.

4. The system of claim 1, wherein the identified code component comprises a JavaScript code component.

5. The system of claim 1, wherein the program code is structured to cause the processor to:
assign a source type to the identified code component based on where the identified code component appears within a structured representation of the web page;
wherein the call from the wrapped code component to the code rewriting and evaluation function further includes the assigned source type of the identified code component as an argument thereof; and
wherein causing execution of the call to the code rewriting and evaluation function further causes the code rewriting and evaluation function to evaluate the rewritten code component in a manner that is dependent upon on the assigned source type of the identified code component that is included in the call from the wrapped code component.

6. The system of claim 5, wherein to assign the source type to the identified code component, the program code is structured to cause the processor to:
assign a URL-specifying attribute source type to the identified code component in response to determining that the identified code component is included in a value of an attribute that is associated with an element of the web page and that specifies a URL;
assign an event attribute source type to the identified code component in response to determining that the identified code component is included in a value of an event attribute that is associated with an element of the web page; or
assign a script element source type to the identified code component in response to determining that the identified code component is included in a script element of the web page.

7. The system of claim 6, wherein causing execution of the call to the code rewriting and evaluation function causes performance of the following when the assigned source type that is included in the call from the wrapped code component is the event attribute source type:
evaluate the rewritten code component inside a function;
evaluate the function in a scope that is identical to a scope of an event handler that would have evaluated the identified code component if the web page was unmodified; and
return an output of the function.

8. The system of claim 7, wherein causing execution of the call to the code rewriting and evaluation function causes evaluation of the function in the scope that is identical to the scope of the event handler that would have evaluated the identified code component if the web page was unmodified by:
extending a scope chain for the evaluation of the function to at least include a scope of the element with which the event attribute is associated and a scope of a document object of the modified version of the web page.

9. The system of claim 6, wherein causing execution of the call to the code rewriting and evaluation function causes performance of the following when the assigned source type that is included in the call from the wrapped code component is the script element source type:
create a new script element that includes the rewritten code component and copy all attributes of a script element that includes the wrapped code component into the new script element;
append the new script element after the script element that includes the wrapped code component in the modified version of the web page, such that the rewritten code component will be evaluated by a web browser that displays the modified version of the web page;
determine if the script element that includes the wrapped code component is attached to a document object of the modified version of the web page;
responsive to determining that the script element that includes the wrapped code component is attached to the document object of the modified version of the web page, remove the script element that includes the wrapped code component from the modified version of the web page; and responsive to determining that the script element that includes the wrapped code component is not attached to the document object of the modified version of the web page, remove the new script element from the modified version of the web page.

10. A method performed by a proxy computing device that is interconnected between a client computing device and a server computing device, comprising:

receiving a web page from the server computing device;
identifying a code component included in the web page;
replacing the identified code component with a wrapped code component that includes a call to a code rewriting and evaluation function, resulting in a modified version of the web page, the call to the code rewriting and evaluation function including the identified code component as an argument thereof; and
sending the modified version of the web page to the client computing device, wherein sending the modified version of the web page causes the client computing device to execute the modified version of the web page and execute the call to the code rewriting and evaluation function to generate a rewritten code component based on the identified code component included in the call and evaluate the rewritten code component.

11. The method of claim 10, wherein analyzing the web page to identifying the code component comprises:

extracting a plurality of code components from the web page;
organizing the plurality of code components into an abstract syntax tree (AST); and
traversing the AST to identify the code component.

12. The method of claim 10, wherein identifying the code component comprises identifying a code component that implements one of:

a navigation action;
a file download action; or
a file upload action.

13. The method of claim 10, wherein the identified code component comprises a JavaScript code component.

14. The method of claim 10, further comprising:

assigning a source type to the identified code component based on where the identified code component appears within a structured representation of the web page;
wherein the call from the wrapped code component to the code rewriting and evaluation function further includes the assigned source type of the identified code component as an argument thereof; and
wherein causing execution of the call causes the code rewriting and evaluation function to evaluate the rewritten code component in a manner that is dependent upon on the assigned source type of the identified code component that is included in the call from the wrapped code component.

15. The method of claim 14, wherein assigning the source type to the identified code component comprises one of:

assigning a URL-specifying attribute source type to the identified code component in response to determining that the identified code component is included in a value of an attribute that is associated with an element of the web page and that specifies a URL;
assigning an event attribute source type to the identified code component in response to determining that the identified code component is included in a value of an event attribute that is associated with an element of the web page; or
assigning a script element source type to the identified code component in response to determining that the identified code component is included in a script element of the web page.

16. The method of claim 15, wherein causing execution of the call causes the code rewriting and evaluation function to perform the following when the assigned source type that is included in the call from the wrapped code component is the event attribute source type:

evaluate the rewritten code component inside a function;
evaluate the function in a scope that is identical to a scope of an event handler that would have evaluated the identified code component if the web page was unmodified; and
return an output of the function.

17. The method of claim 16, wherein causing execution of the call to the code rewriting and evaluation function causes evaluation of the function in the scope that is identical to the scope of the event handler that would have evaluated the identified code component if the web page was unmodified by:

extending a scope chain for the evaluation of the function to at least include a scope of the element with which the event attribute is associated and a scope of a document object of the modified version of the web page.

18. The method of claim 15, wherein causing execution of the call to the code rewriting and evaluation function causes performance of the following when the assigned source type that is included in the call from the wrapped code component is the script element source type:

create a new script element that includes the rewritten code component and copy all attributes of a script element that includes the wrapped code component into the new script element; and
append the new script element after the script element that includes the wrapped code component in the modified version of the web page, such that the rewritten code component will be evaluated by a web browser that displays the modified version of the web page.

19. The method of claim 18, wherein causing execution of the call to the code rewriting and evaluation function causes performance of the following after the appending step when the assigned source type that is included in the call from the wrapped code component is the script element source type:

determine if the script element that includes the wrapped code component is attached to a document object of the modified version of the web page;
responsive to determining that the script element that includes the wrapped code component is attached to the document object of the modified version of the web page, remove the script element that includes the wrapped code component from the modified version of the web page; and
responsive to determining that the script element that includes the wrapped code component is not attached to the document object of the modified version of the web page, remove the new script element from the modified version of the web page.

20. A method performed by a client computing device, the method comprising:

sending a request for a web page to a proxy computing device;
responsive to sending the request, receiving from the proxy computing device a modified version of the web page, wherein the modified version of the web page includes a wrapped code component that replaces a code component in the web page and that comprises a call to a code rewriting and evaluation function that is not included in the web page, the call to the code rewriting and evaluation function including the code component as an argument thereof;

executing the modified version of the web page; and causing execution of the call to the code rewriting and evaluation function to generate a rewritten code component by rewriting the code component that is included in the call from the wrapped code component and to evaluate the rewritten code component.

* * * * *